United States Patent [19]

Woodhouse

[11] Patent Number: 4,954,263

[45] Date of Patent: Sep. 4, 1990

[54] COAGULATION TREATMENT OF FLUIDS

[75] Inventor: Derek A. Woodhouse, Stafford, England

[73] Assignee: D.A.W. Enterprises Limited, England

[21] Appl. No.: 175,769

[22] Filed: Mar. 31, 1988

[30] Foreign Application Priority Data

Apr. 4, 1987 [GB] United Kingdom ............... 8708115

[51] Int. Cl.$^5$ .............. B01D 35/06; C02F 1/48; C02F 1/50

[52] U.S. Cl. ............... 210/695; 210/748; 210/764; 210/805; 210/169; 210/198.1; 210/222; 210/243; 204/149; 204/155; 426/247; 422/22; 422/29

[58] Field of Search ............ 204/248, 130, 149–155, 204/131; 210/695, 222, 223, 748, 764, 198.1, 257.1, 169, 696, 805, 243; 422/28, 29, 22, 265–267; 55/2, 100, 107, 134; 426/237, 244, 247

[56] References Cited

U.S. PATENT DOCUMENTS

| | | | |
|---|---|---|---|
| 2,046,467 | 7/1936 | Krause | 426/247 |
| 2,344,548 | 3/1944 | Goetz | 426/247 |
| 2,652,925 | 9/1953 | Vermeiren | 210/222 |
| 3,875,743 | 4/1975 | Mercer | 55/100 |
| 4,291,125 | 9/1981 | Greatbatch | 204/131 |
| 4,304,648 | 12/1981 | Vellas | 204/DIG. 13 |
| 4,367,143 | 1/1983 | Carpenter | 210/222 |
| 4,372,852 | 2/1983 | Kovacs | 210/222 |
| 4,416,854 | 11/1983 | Nielsen | 210/764 |
| 4,492,618 | 1/1985 | Eder | 210/169 |
| 4,519,919 | 5/1985 | Whyte et al. | 210/695 |
| 4,568,901 | 2/1986 | Adam | 210/222 |
| 4,610,783 | 9/1986 | Hudson | 210/169 |
| 4,734,202 | 3/1988 | Mach | 210/95 |
| 4,755,268 | 7/1988 | Matsuo et al. | 204/131 |

Primary Examiner—W. Gary Jones
Attorney, Agent, or Firm—W. Thad Adams, III

[57] ABSTRACT

A method of treating fluids to induce coagulation of particles comprises subjecting the fluid to the influence of a repulsive magnetic field, that is a magnetic field generated between opposed like magnetic poles as distinct from a magnetic field generated between North and South poles. Preferably oligo-dynamic particles of mineral or other substances are introduced into the fluid before, during or after magnetic treatment. The preferred method of particle introduction is by sacrificial anode incorporated in an electrical circuit with a cathode and the fluid as an electrolyte. The invention may be applied to the treatment of hard water to prevent or reduce deposition of scale and in the treatment of swimming pool water to eliminate bacteria and/or control formation of algae. A variety of other uses in relation to both liquids and gases are described.

26 Claims, 3 Drawing Sheets

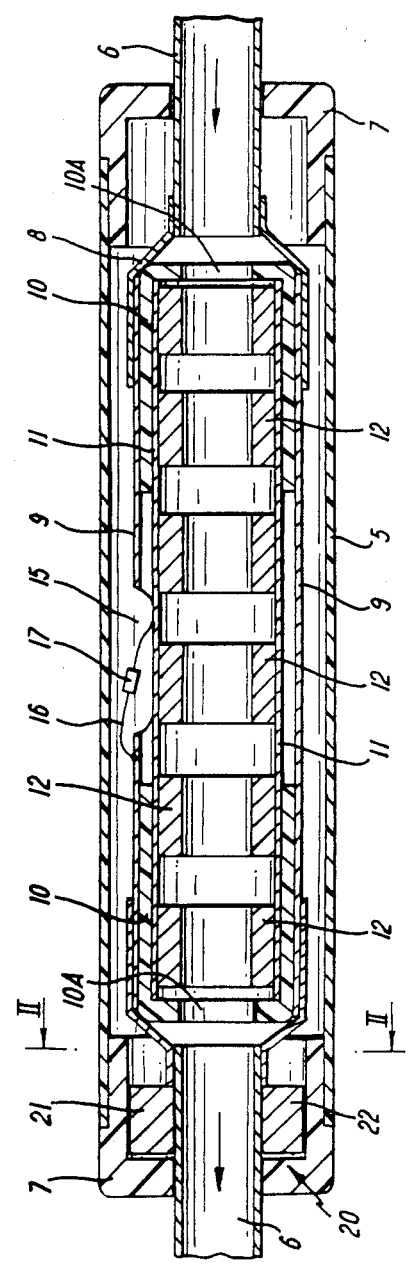
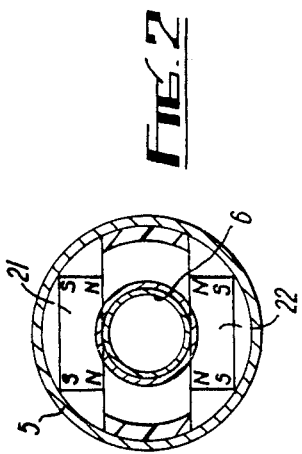
Fig. 1
Fig. 2

COAGULATION TREATMENT OF FLUIDS

This is invention relates to methods and means for inducing the coagulation of particles in fluids.

The invention may be employed in the removal of impurities from liquids or gases by inducing coagulation of such impurities to facilitate their collection and removal or prevent deposition on vessels, containers or other equipment in which the fluid is contained or through which it passes. Alternatively the invention may be employed to introduce materials into liquids or gases in a uniformly dispersed manner.

In its broadest aspect the invention comprises a method for the treatment of a fluid to induce coagulation of particles in the fluid comprising subjecting the fluid to the influence of a repulsive magnetic field.

The term "repulsive magnetic field" is used herein to refer to a magnetic field generated between opposed like magnetic poles, that is to say opposed South poles or opposed North poles as distinct from a magnetic field generated between North and South poles which is termed an attractive magnetic field.

Preferably oligo-dynamic particles of mineral or other substances are introduced into the fluid before, during or after the fluid is subjected to said magnetic field.

It has been found that by passage of a fluid through a repulsive magnetic field and introduction of oligo-dynamic particles, very rapid and effective coagulation of the introduced particles and particles already present in the fluid is achieved. Surprisingly, best results are achieved by passing the fluid through the field before introduction of particles, but the invention is also effective when the fluid is subjected to the field during or after introduction of the particles.

Preferably the introduced particles are of finer size than and are numerically greater than the existing particles.

The invention also provides apparatus for use in the treatment of fluids comprising means for generating a repulsive magnetic field and means constraining the fluid to pass into the influence of said magnetic field. Preferably the apparatus also includes means for effecting introduction of oligo-dynamic particles of minerals or other substances into the fluid before, during or after passage of the fluid into the influence of said field.

Preferably said means for introducing said particles comprises a sacrificial anode incorporated in an electrical circuit with a cathode and the fluid as electrolyte. The electrical current flowing in said circuit may be self-induced or may be derived from an external electrical potential applied across the circuit. Said means for generating said magnetic field may comprise a permanent magnet or an electro-magnet.

The invention may be applied in the treatment of hard water to prevent or reduce the deposition of scale on containers, conduits or apparatus in which the water is contained or through which it flows. In the case of devices operating on self induced current the anode requires to be composed of a metal which is sufficiently separated on the galvanic scale from the cathode metal to form an electrolytic current consuming cell.

As applied to the treatment of hard water the anode metal in addition to releasing positively charged ions must release negatively charged salt particles and ions into the water during operation of the device, at least a substantial proportion of such particles and ions being non-adherent both to the anode and the cathode whereby to remain in suspension in the water. These requirements are met by use of anode materials which produce amphoteric hydroxides, such as zinc, combined with a copper cathode. Other suitable materials from which the anode may be constructed include aluminium, silver and copper.

In the case of aluminium the morphology produced by the invention overcomes the problems usually associated with the glutinous nature of aluminium hydroxide particles formed during electrolysis.

BRIEF DESCRIPTION OF THE DRAWINGS

FIG. 1 is a vertical cross-section through a device adapted to be inserted in a water supply pipe.

FIG. 2 is a cross-section on the line II—II in FIG. 1.

Figure 3:
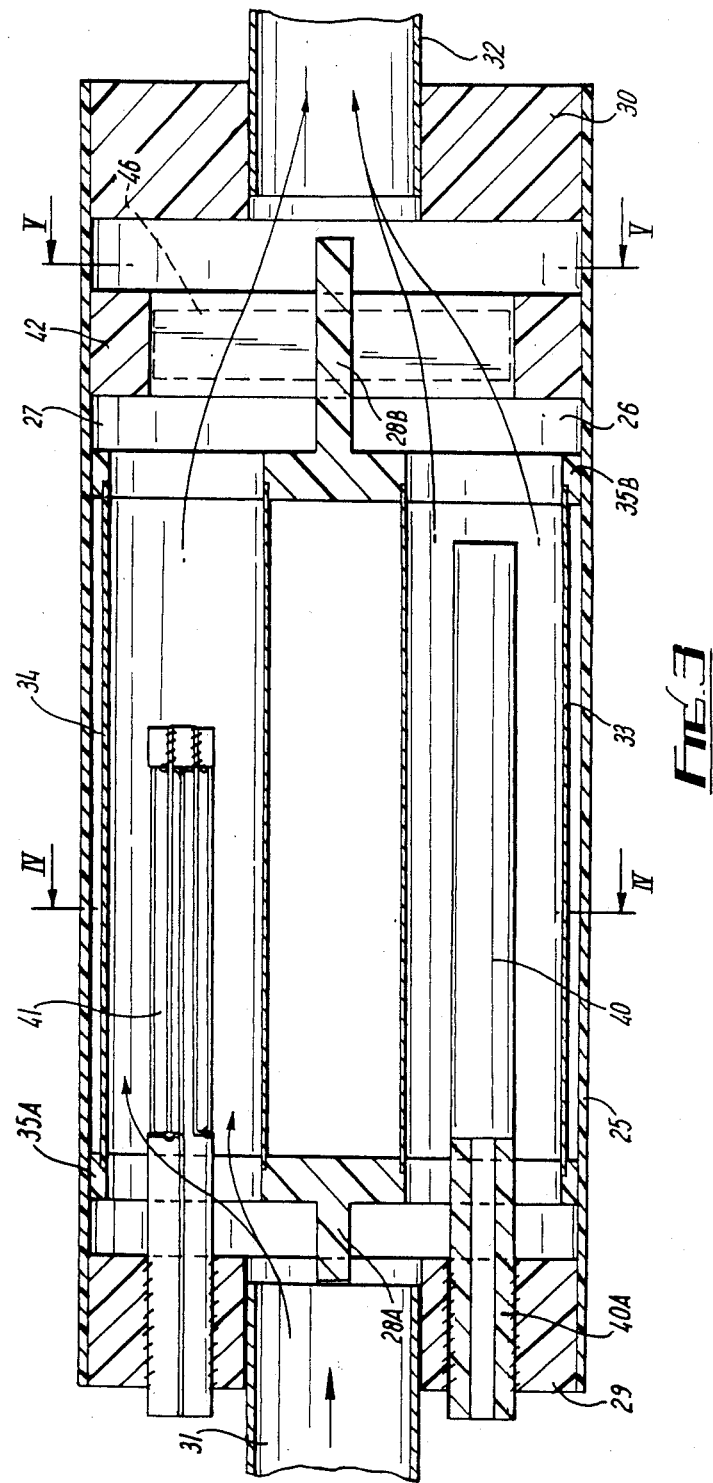
FIG. 3 is a longitudinal cross-section through a device for the treatment of swimming pool water.

An embodiment of the invention suitable for use in the treatment of hard water will now be described, by way of example only, with reference to FIG. 1 and FIG. 2 of the accompanying drawings.

Referring to the drawings, the device comprises an outer casing 5 of plastics or other electrically insulating material from the opposite ends of which copper tubes 6 project for connection to a section of pipe in which the device is to be fitted. The copper tubes 6 are supported in end caps 7 of plastics or other electrically insulating material and are connected at their inner ends through copper connectors 8 to a section 9 of copper tube located within and spaced from the outer casing 5 of the device. Bushes 10 of nylon or other electrically insulating material are mounted within each end of the copper tube 9 and incorporate openings 10A in their ends through which liquid may flow. The bushes 10 act as supports for a stainless steel tube 11 within which rings 12 of zinc are a tight push fit.

A section of the copper tube 9 is cut away to form an opening 15 through which passes a wire 16 incorporating a resistor 17. The opposite ends of the wire are connected to the copper tube 9 and stainless steel tube 11 thus forming an electrical connection between the copper tube which acts as a cathode and the steel tube and hence the zinc rings 11, which act as an anode. It has been found that the zinc maintains the stainless steel in an anodic anode.

It has been found desirable to maintain an optimum ratio between the surface area of the anode and the flow rate of liquid through the device. In practice devices will be constructed in a range of sizes to suit different applications and it has been found that best results are attained if the ratio of surface area in square centimeters to averge maximum flow rate in liters per minute is between 1.55 and 1.75 and preferably around 1.65. This ensures that an adequate concentration of released zinc particles is maintained in the water flowing through the device. By construction of a suitable range of devices of different size the optimum ratio may be achieved over the full range of flow rates encountered in practice. The resistor controls and stabilizes the current flow in the circuit and is preferably a 0.5 watt resistor of 500 ohms or greater. The self induced voltage generated by virtue of the different electrical potentials of the anode and cathode is very small, generally of the order of the 0.5 m.V.

In operation the device is inserted into a supply conduit of, for example, a water system. As the connecting members 6 and tube 9 on the one hand and the rings 12 on the other hand are formed from different metals, a potential difference exists between them due to their different positions on the galvanic scale. When liquid passes through the device it forms a conducting path allowing current to flow round the circuit formed by the wire 16. The liquid passing through the device is therefore subjected to a self-induced electric field which affects the electrical potential of the suspended scale-forming particles in the liquid and counters the deposition of scale.

The performance of the device is substantially improved by passage of the water through a repulsive magnetic field. For this purpose a permanent magnet or electro-magnet 20 is positioned at the outlet end of the device shown in FIG. 1. The magnet comprises a pair of opposed magnetic pole pieces 21 and 22 having their like poles, in the illustrated arrangement their North poles, directed towards one another so that the magnetic forces generated tend to repel one another and create a repulsive magnetic field between the pole pieces. The particles released by the zinc anodes of the electrolytic cell device pass through the magnetic field which has the effect of inducing very rapid coagulation of scale-forming particles in the water with the introduced particles. The organisms so formed remain in suspension in the water and are carried out of the device with the through flow of water.

In this way the tendency to form scale deposits on the inner surfaces of conduits annd containers is reduced or eliminated. When used on a small to medium sized domestic water supply system a single device fitted to the lead-in pipe will effectively inhibit scale encrustation throughout the system for the life of the device. Extra devices may however be required in some cases and in the case of industrial applications.

The device may be a passive electrolytic device in which no external power source is required for the electrolytic action, the current flow deriving from electrical potential generated by flow of water through the device. However in industrial applications there are advantages to be gained by exerting a more direct control over the electrolytic release of zinc or other particles from the anode and this can be done by applying an external potential and "driving" the chemical reaction at the electrode surface.

It should be appreciated that the precise manner in which the mechanism of the present invention operates is not fully understood. It appears however that the effect of the repulsive magnetic field is to cause the introduced oligo-dynamic particles to attach themselves to the particles already existing in the liquid. At the same time some degree of coagulation of existing particles takes place. The extent to which the particles coagulate can be controlled by variations in both the magnetic and electrical field strengths. Most liquids and gases contain particulate matter often, as in the case of water, in the form of impurities. The altered morphology resulting from the present invention inhibits the natural tendency to form encrustations of scale. The coagulated or coated particle structure is extremely stable and the particles are withdrawn from the system with the water. As a result scale encrustation on the internal surfaces of the system is reduced or eliminated.

The invention may also be employed to treat fluids by the introduction of materials having desired effects on the fluids or on vessels, containers or other equipment in which they are contained or through which they flow. One such application is in the treatment of swimming pools to disinfect the water and control the formation of algae. For this purpose silver and copper salts are introduced, the former acting to destroy bacteria and the latter to kill algae. Previously proposed techniques of this kind have suffered from the drawback that it has been difficult to ensure adequate distribution of silver and copper salts throughout the pool water and the manner of introduction has tended to cause the silver and copper salts to react or combine with one another and become less effective. By virtue of the present invention such salts are introduced using existing particles already within the water as carriers thereby eliminating these disadvantages.

Thus according to a further aspect of the invention there is provided a method for treating water to eliminate bacteria and/or algae comprising introducing into the water electrically charged oligo-dynamic metallic salt particles of silver and/or copper, subjecting the water to a repulsive magnetic force, circulating the water through a pool, withdrawing the water, and extracting dead material by filtering.

Where both silver and copper salt particles are introduced, introduction and magnetic treatment is preferably effected separately in relation to each metallic salt before introducing the treated water to the pool.

Preferably the oligo-dynamic particles are introduced by electrolysis using the water as electrolyte.

Figure 4:
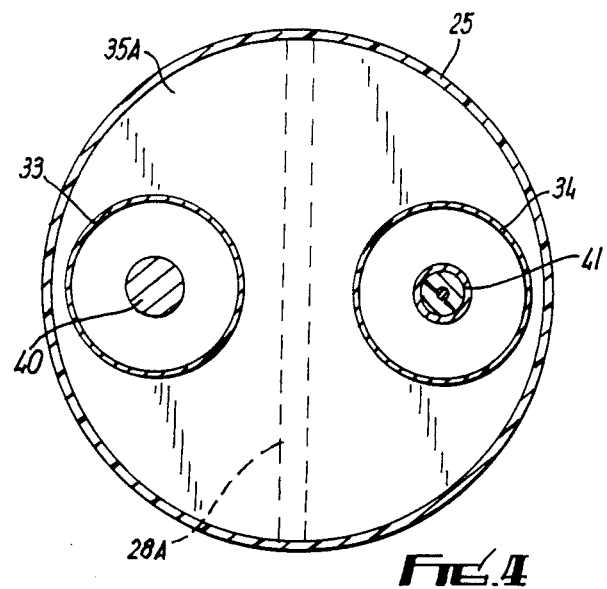
FIG. 4 is a cross-section on the line IV—IV in FIG. 3.
Figure 5:
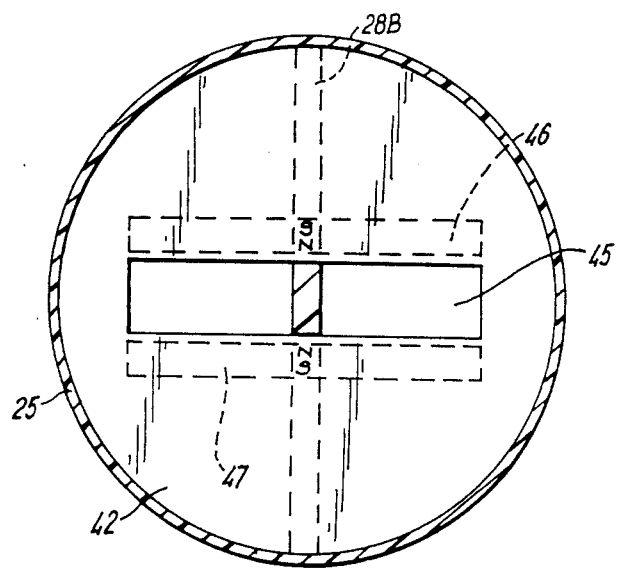
FIG. 5 is a cross-section on the line V—V in FIG. 3.

An embodiment of the invention for use in the treatment of swimming pool water to eliminate bacteria and algae will now be described, by way of example only, with reference to FIGS. 3 to 5 of the accompanying drawings.

Referring to the drawings the device comprises a cyclindrical casing 25 of plastics or other electrically insulating material opposite ends of which are divided into semi-cylindrical chambers 26 and 27 by means of inlet and outlet dividers 28A and 28B also of electrically insulating material. Electrically insulating end pieces 29 and 30 are provided at opposite ends of the body 25 and incorporate centrally located inlet and outlet pipes 31 and 32 by means of which water to be treated flows into and out of the device. The direction of water flow is indicated by the arrows in FIG. 3.

Copper tubes 33 and 34 are mounted within the casing 25 being supported at their opposite ends by support members 35A and 35B in the form of discs of plastics or other electrically insulating material. The tubes 33 and 34 are interconnected towards their inlet and outlet ends whereby water entering the device through inlet pipe 31 may flow through both tubes 33 and 34 before passing to the outlet pipe 32.

A copper rod 40 supported in a nylon bush 40A in the end plug 29 is centrally mounted within the tube 33. A silver rod 41 in the form of an outer silver tube supported on a hollow nylon support through which a silver wire extends is also mounted in the end plug 29 and is centrally located within the copper tube 34. Each of the rods 40 and 41 constitutes an anode connected through an external electrical circuit with the associated copper tubes which act as permanent cathodes, the arrangement being such that the anodes 40 and 41 release electrically charged oligo-dynamic silver and copper salt particles and ions into water flowing over them from the inlet pipe 31 to the outlep pipe 32.

The disc 42 is mounted in the casing 25 between the support member 35B and the outlet pipe 32 and incorporates a horizontal aperture 45 above and below which are located magnets 46 and 47 having their North poles directed towards the aperture. The magnets therefore create in the aperture 45 a repulsive magnetic field through which water flowing through the device and containing charged particles of copper and silver species passes to the outlet pipe 32. The central partition 28B extends through the aperture 45 whereby the salt and silver particles are maintained separate during their passage through the repulsive magnetic field. By virtue of the magnetic action the particles attach themselves to particles of impurities already contained within the water and thereby become essentially uniformly distributed through the water. After passage through the two sections of the opening 45 the treated water streams come together and leave the device through the outlet pipe 32.

Due to their different electrical charges the salt particles attach themselves to the scale-forming particles or other impurities contained within and distributed throughout the water and are thus circulated to all regions of the pool to act upon bacteria and algae. By recirculating the pool water through the treatment unit, controlled quantities of oligo-dynamic particles of the silver and copper species may be introduced as required and dead material removed by filtering to effect continuous purification treatment.

The introduction of oligo-dynamic silver species may also be used for a wide range of other purposes. The shelf and working life of cutting oils or other lubricants may be increased by introduction of silver species effective to kill bacteria which have the effect of decomposing constituents of the oil. Similar treatment may be applied to a wide range of food products to eliminate harmful bacteria, silver salts being suitable for treatment of food products as they have no harmful effects on the human body when limited to World Health Organisation restrictions. Deterioration of wine, beer, dyes, detergents and other products may also be prevented in this way. Silver may also be introduced into paint and similar coating materials to inhibit crustations and marine organisms from attaching to boats, oil platforms and the like.

In a further aspect the invention may be employed in the treatment of plants, particularly in the field of hydroponics. For this purpose nutrient salts may be introduced in the form of oligo-dynamic particles into water to be used for the nourishment of plants, the treated water then being subjected to a repulsive magnetic force. By appropriate regulation of the rate of introduction, nutrients may be continuously fed over an extended period during plant growth. Where an electromagnet supplied from an external electrical supply is employed this may be varied at different times during the growth of the plant to alter the quantities of nutrient supplied in accordance with varations in the plant's requirements.

The above embodiments refer to the treatment of liquids but the invention may also be applied to the treatment of gases or liquid/gas mixtures. For example, by the introduction of oligo-dynamic particles into the discharge from power stations, followed by passage through a repulsive magnetic field, damaging nitrous oxide and sulphurous oxide contaminants may be induced to coagulate on the introduced particles and may then be removed by filtering before they are discharged to atmosphere. Impurities in vehicle exhausts gases may also be induced to coagulate in a similar manner and will then be discharged in solid form and not dispersed as gases into the surrounding atmosphere.

By virtue of the arrangements described a wide range of liquids and gases or liquid/gas mixtures may be treated in beneficial ways either to remove contaminants or to introduce treating agents. The various examples referred to above are illustrations only of the many possible applications of the invention. A further example is the encapsulation with lead of radio-active particles in a liquid or gas.

Various modifications may be made without departing from the invention. For example many forms of apparatus may be constructed for different purposes employing the techniques of the invention and a wide range of metallic salt or other species in the form of particles and ions may be introducd into different liquids or gases dependent on requirements. While in the embodiments described the fluids are subjected to the repulsive magnetic field after introduction of the oligo-dynamic particles, they may be subjected to the field before or during particle introduction. Passage of the fluid through the field before introduction of the particles has surprisingly been found to increase the speed of particle aggregation and flocculation and produce more compact and denser floc. Coagulation and flocculation is also attained by passing the fluid through a repulsive magnetic field without introduction of oligo-dynamic species. By selection between or combination of these alternative techniques the method of treatment may be adapted to different situations and fluids to obtain desired and results.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method for the treatment of a fluid comprising introducing oligo-dynamic particles into the fluid by electrolytic means using the fluid as an electrolyte whereby to form sites for coagulation and crystal formation in the fluid, passing the fluid between like magnetic poles generating a repulsive magnetic field, and permitting the thus treated particles to remain in and flow with the fluid whereby to enhance subsequent coagulation and crystal formation of the introduced particles and particles already present in the fluid.

2. A method according to claim 1 wherein said fluid is passed through said repulsive magnetic field before introduction of said particles.

3. A method according to claim 1 wherein said fluid is passed through said repulsive magnetic field during or after introduction of said particles.

4. A method according to claim 1 wherein said introduced particles are of a finer size then the existing particles in the fluid.

5. A method according to claim 1 wherein said introduced particles are greater in number than the existing particles in the fluid.

6. A method according to claim 1 for preventing or reducing the deposition of scale wherein said fluid comprises hard water and said particles comprise electrically charged oligo-dynamic metallic salt particles of a non-toxic metal which produces an amphoteric hydroxide in aqueous solution.

7. A method according to claim 6 wherein said particles are particles of zinc hydroxide.

8. A method according to claim 1 for the elimination of bacteria wherein said fluid is a liquid and said particles comprise metallic salt particles of silver.

9. A method according to claim 8 wherein said liquid is an oil.

10. A method according to claim 8 wherein metallic salt particles of copper are introduced for the elimination of algae.

11. A method according to claim 10 for treatment of swimming pool water wherein introduction and magnetic treatment is effected separately in relation to each metallic salt, following which the treated water is circulated through the pool and withdrawn for withdrawal of dead material by filtering.

12. A method according to claim 8 for the prevention of deterioration by bacterial action wherein said liquid is selected from liquid food products, wine, beer, dyes, detergents, paint and liquid coating materials.

13. A method according to claim 1 for the treatment of plants wherein said fluid comprises water and said particles comprise particles of plant nutrients.

14. A method according to claim 1 for the purification of gaseous emissions wherein said fluid is selected from power station discharges and engine exhaust gases.

15. A method according to claim 1 wherein said fluid contains radio-active particles and said oligo-dynamic particles comprise metallic salt particles of lead.

16. Apparatus for use in the treatment of fluids comprising electorlytic means for introducing oligo-dynamic particles into the fluid using the fluid as a electrolyte, and means constraining the fluid to pass through a repulsive magnetic field generated by opposed like magnetic poles, the treated particles remaining in the fluid and being permitted to flow out of the apparatus with the fluid, whereby to enhance subsequent coagulation and crystal formation of the introduced particles and particles already present in the fluid.

17. Apparatus according to claim 16 wherein said magnetic poles are poles of a permanent magnet.

18. Apparatus according to claim 16 wherein said magnetic poles are poles of an electro-magnet.

19. Apparatus according to claim 16 wherein said means for introducing said particles comprises a sacrificial anode incorporated in an electrical circuit with a cathode and the fluid as electrolyte.

20. Apparatus according to claim 19 wherein said circuit is driven by a self-induced electrical potential.

21. Apparatus according to claim 19 wherein said circuit is driven by an applied external electrical potential.

22. Apparatus according to claim 19 wherein said anode is composed of a metal which is non-toxic and forms an amphoteric hydroxide in aqueous solution.

23. Apparatus according to claim 22 wherein said anode is formed from zinc.

24. Apparatus according to claim 23 wherein said cathode is formed from copper.

25. Apparatus according to claim 22 wherein said anode is formed from silver.

26. Apparatus according to claim 25 wherein said cathode is formed from copper.

* * * * *